(12) United States Patent
Yeh

(10) Patent No.: US 9,237,592 B1
(45) Date of Patent: Jan. 12, 2016

(54) METHODS FOR ESTABLISHING A DIRECT CONNECTION BETWEEN APPARATUSES AND SYSTEMS USING THE SAME

(71) Applicant: Wistron Corp., New Taipei (TW)

(72) Inventor: Ming-Fong Yeh, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/588,370

(22) Filed: Dec. 31, 2014

(30) Foreign Application Priority Data

Jul. 16, 2014 (TW) .............................. 103124373 A

(51) Int. Cl.
| | | |
|---|---|---|
| *H04W 64/00* | (2009.01) | |
| *H04W 76/02* | (2009.01) | |
| *H04W 4/00* | (2009.01) | |
| *H04W 4/02* | (2009.01) | |
| *H04L 29/08* | (2006.01) | |

(52) U.S. Cl.
CPC .......... *H04W 76/023* (2013.01); *H04L 67/104* (2013.01); *H04W 4/008* (2013.01); *H04W 4/02* (2013.01); *H04W 64/00* (2013.01)

(58) Field of Classification Search
CPC .......... H04W 64/00; H04W 4/02; H04W 4/22
USPC ............. 455/404.2, 414.2, 414.3, 456.1, 41.2
See application file for complete search history.

(56) References Cited

U.S. PATENT DOCUMENTS

| | | | | |
|---|---|---|---|---|
| 8,400,268 B1 * | 3/2013 | Malik | .................... | G06Q 10/06 340/539.12 |
| 8,887,430 B2 * | 11/2014 | Wichner | ................. | F41A 17/12 42/70.01 |
| 2008/0204277 A1 * | 8/2008 | Sumner | .................... | G08G 1/08 340/910 |
| 2009/0293016 A1 * | 11/2009 | Potevin | ............. | H04M 1/72569 715/810 |
| 2010/0309818 A1 * | 12/2010 | Kim | ...................... | H04W 84/18 370/254 |
| 2011/0018769 A1 * | 1/2011 | Misikangas | ........... | G01S 5/0072 342/451 |
| 2012/0026987 A1 * | 2/2012 | Jain | .................... | H04W 74/0866 370/336 |
| 2012/0300761 A1 * | 11/2012 | Vasko | .................... | H04W 48/16 370/338 |
| 2013/0229944 A1 | 9/2013 | Montemurro et al. | | |
| 2013/0235760 A1 * | 9/2013 | Merlin | .................. | H04W 76/02 370/254 |
| 2013/0329600 A1 | 12/2013 | Vedula et al. | | |
| 2014/0357292 A1 * | 12/2014 | Walma | ................. | H04W 64/00 455/456.1 |
| 2015/0281908 A1 * | 10/2015 | Venkatraman | .......... | H04W 4/04 455/456.6 |

FOREIGN PATENT DOCUMENTS

| | | |
|---|---|---|
| CN | 101470547 A | 7/2009 |
| CN | 102523556 A | 6/2012 |
| CN | 102821192 A | 12/2012 |

OTHER PUBLICATIONS

Taiwan Patent Office, Office Action, Patent Application Serial No. 103124373, Oct. 19, 2015, Taiwan.

* cited by examiner

*Primary Examiner* — Minh D Dao

(57) ABSTRACT

The invention introduces a method for establishing a direct connection, executed by a processing unit of a first electronic apparatus, which contains at least the following steps. A first location of the first electronic apparatus and an angle of the first electronic apparatus are obtained. Second locations are collected via a communications interface of the first electronic apparatus, where each second location is of a second electronic apparatus. It is determined which of the second electronic apparatuses the first electronic apparatus is aimed at, according to the first location, the second locations, and the angle of the first electronic apparatus. A direct connection is established with the determined second electronic apparatus via the first communications interface.

22 Claims, 7 Drawing Sheets

METHODS FOR ESTABLISHING A DIRECT CONNECTION BETWEEN APPARATUSES AND SYSTEMS USING THE SAME

CROSS REFERENCE TO RELATED APPLICATIONS

This Application claims priority of Taiwan Patent Application No. 103124373, filed on Jul. 16, 2014, the entirety of which is incorporated by reference herein.

BACKGROUND

1. Technical Field

The present invention relates to wireless communications technology, and in particular to methods for establishing a direct connection between apparatuses and systems using the same.

2. Description of the Related Art

A direct connection, such as Wi-Fi Direct, Wi-Fi P2P, Bluetooth, etc., enables devices to connect with each other, without requiring a wireless access point, to communicate for various operations from file transfer to Internet connectivity. The typical pairing of the devices may be set up to require the proximity of a near field communication or the providing of a QR (Quick Response) code displayed on one device, which is captured and recognized by the other device. Alternatively, a device may scan all surrounding devices capable of establishing a direct connection and provide a UI (User Interface) to help a user to determine which one of the scanned devices is to be connected. However, the typical pairing is inconvenient for the user. Thus, it is desirable to have methods for establishing a direct connection between apparatuses and systems using the same.

BRIEF SUMMARY

An embodiment of the invention introduces a method for establishing a direct connection, executed by a processing unit of a first electronic apparatus, which contains at least the following steps. A first location of the first electronic apparatus and an angle of the first electronic apparatus are obtained. Second locations are collected via a communications interface of the first electronic apparatus, where each second location is of a second electronic apparatus. It is determined which of the second electronic apparatuses the first electronic apparatus is aimed at, according to the first location, the second locations, and the angle of the first electronic apparatus. A direct connection is established with the determined second electronic apparatus via the first communications interface.

An embodiment of the invention introduces a system for establishing a direct connection, which contains at least a first electronic apparatus. The first electronic apparatus contains at least a communications interface, a positioning unit, a sensor and a processing unit. The processing unit, coupled to the first communications interface, the first positioning unit and the sensor, obtains a first location of the first electronic apparatus from the positioning unit; obtains an angle of the first electronic apparatus from the sensor; collects second locations via the communications interface, where each second location is of a second electronic apparatus; determines which of the second electronic apparatuses the first electronic apparatus is aimed at, according to the first location, the second locations, and the angle of the first electronic apparatus; and establishes a direct connection with the determined second electronic apparatus via the communications interface.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
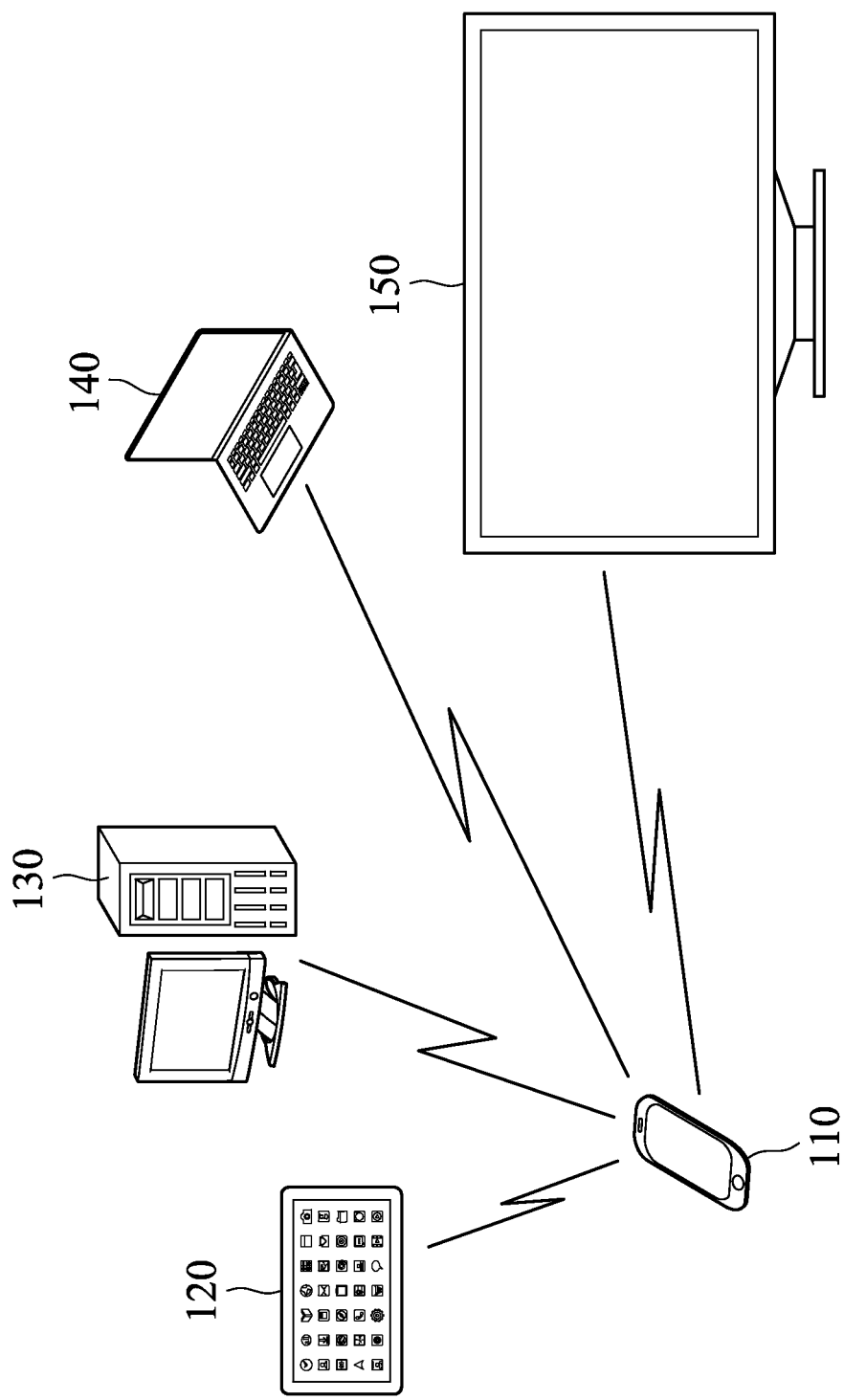
FIG. 1 illustrates the network system architecture according to an embodiment of the invention.

FIG. 1 illustrates the network system architecture according to an embodiment of the invention, containing a mobile phone 110, a tablet computer 120, a desktop computer 130, a notebook computer 140 and a smart TV (television) 150, each of which has capability of establishing a direct connection therebetween. A user may use a direct connection for connecting the mobile phone 110 to the tablet computer 120 as a gaming device to compete in real-time. The user may connect the mobile phone 110 to the desktop computer 130 or the notebook computer 140 in order to sync calendars. The user may also connect the mobile phone 110 to the smart TV 150 so as to view photos or downloaded videos. Although the embodiments have been described using Wi-Fi Connect as follows, it is noted that these are merely an exemplary protocol, and the invention is equally applicable to systems having other protocols, such as Bluetooth. Taking Wi-Fi Connect as an example, the mobile phone 110 may signal to other devices 120 to 150 in the area that mobile phone 110 can make a connection. With regard to the session setup for Wi-Fi Direct, the mobile phone 110 starts by performing a traditional Wi-Fi scan and subsequently find existent Wi-Fi devices, such as the electronic apparatuses 120 to 150. After scanning, the following three phases are required for building the topology of Wi-Fi Direct, namely, Discovery, GO (Group Owner) Negotiation, and WPS (Wi-Fi Protected Setup) Provisioning. In the Discovery phase, Wi-Fi devices operate in the search and listen states on one of the channels, such as 1, 6 or 11 in the 2.4 GHz band. In the search state, a Wi-Fi device sends the Probe Request message and in the listen state the Wi-Fi device responds with the Probe Response message. Once the two Wi-Fi devices have found each other, they start the GO Negotiation phase. The object of this phase is to decide which device acts as the GO. It is implemented using a three-way handshake: GO Negotiation Request, Response, and Confirmation. Finally, the Wi-Fi devices make a secure connection to help protect their communication using the WPS process. This phase may be performed by introducing a PIN in the Wi-Fi device.

Figure 2:
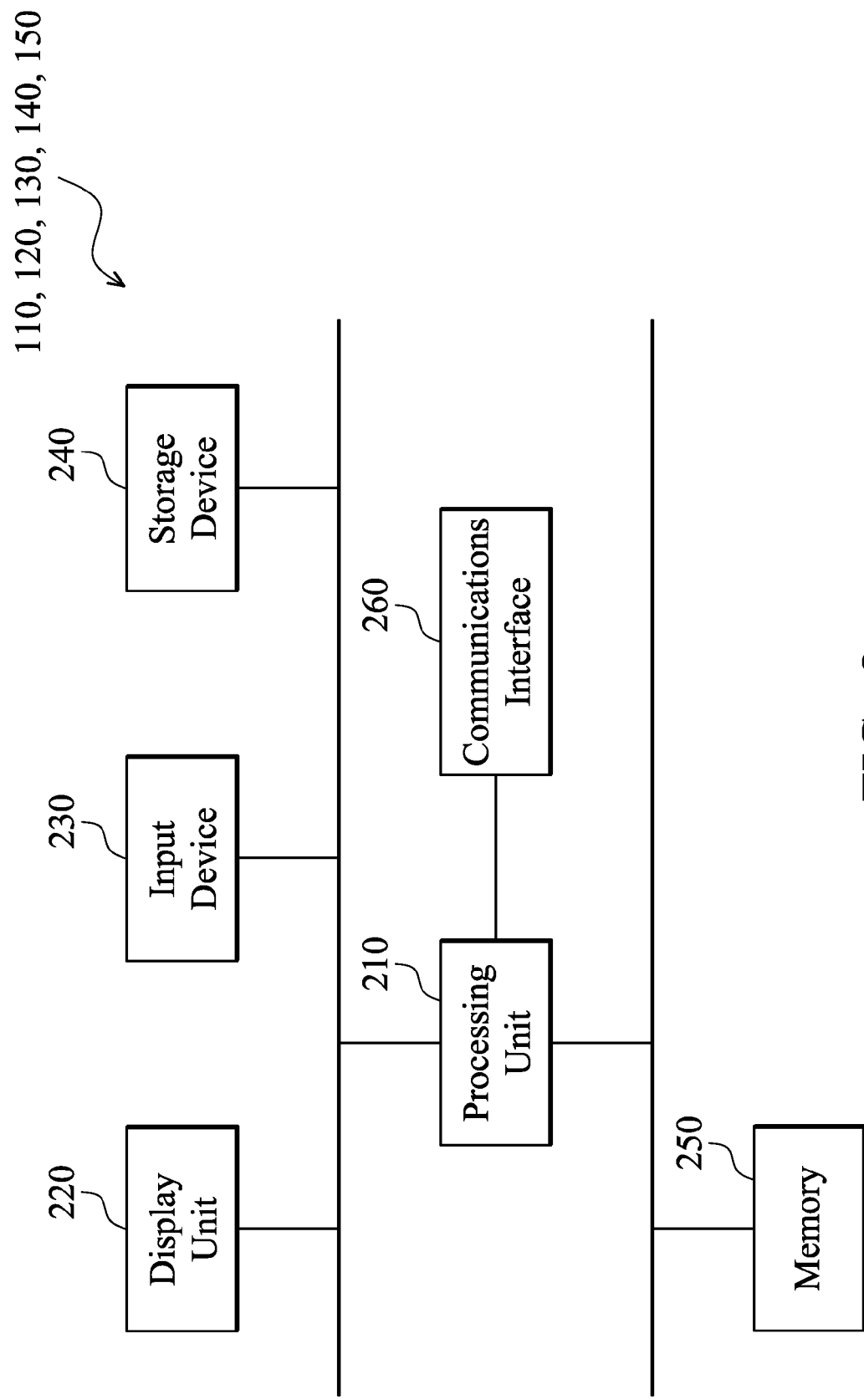
FIG. 2 is the system architecture of an electronic apparatus according to an embodiment of the invention.

FIG. 2 is the system architecture of an electronic apparatus according to an embodiment of the invention. The system architecture may be practiced in the mobile phone 110, the tablet computer 120, the desktop computer 130, the notebook computer 140, the smart TV 150 or another electronic apparatus with computation capability. A processing unit 210 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The system architecture further includes a memory 250 for storing necessary data in execution, such as variables, data tables, etc., and a storage unit 240 for storing a wide range of electronic files, such as Web pages, documents, video files, audio files, etc. A communications interface 260 is included in the system architecture and the processing unit 210 can thereby communicate with another electronic apparatus. The communications interface 260 may be a WLAN (Wireless Local Area Network) module or a Bluetooth module. An input device 230 may include a touch panel to help a user to make a gesture to control a running application. The gestures include, but are not limited to, a single-click, a double-click, a single-finger drag, and a multiple finger drag. The input device 230 may further include a keyboard, a keypad, a mouse, etc. A display unit 220 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view.

Figure 3:
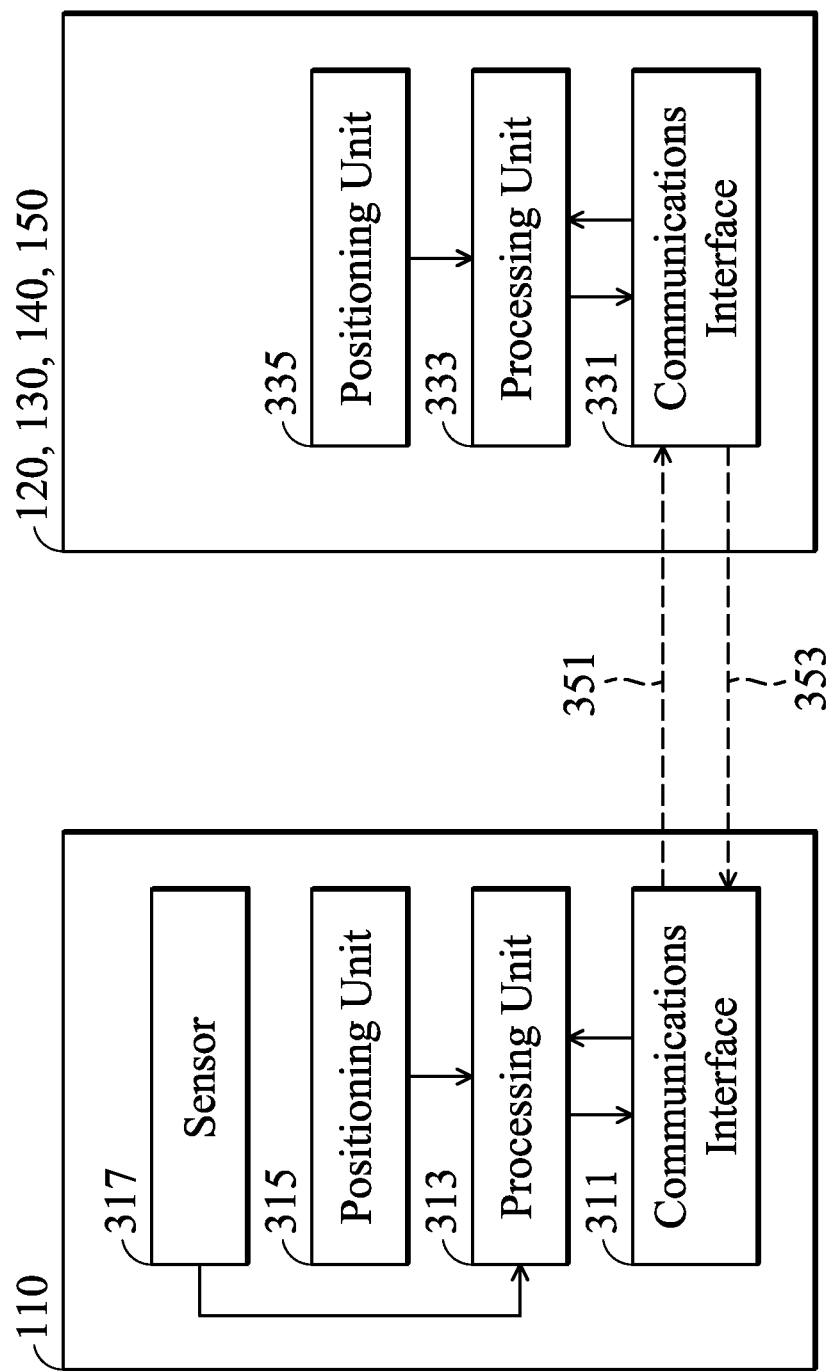
FIG. 3 is a system block diagram for paired devices according to an embodiment of the invention.

FIG. 3 is a system block diagram for paired devices according to an embodiment of the invention. The mobile phone 110 in the search state sends the Probe Request message 351 by its communications interface 311 to the communications interface 331 of the electronic apparatuses 120 to 150. Any of the electronic apparatuses 120 to 150 in the listen state sends the Probe Response message by its communications interface 331 to the communications interface 311 of the mobile phone 110. Technical details of the communications interface 311 or 331 may be referred to a description of the communications interface 260 as shown in FIG. 2. Technical details of the processing unit 313 or 333 may be referred to a description of the processing unit as shown in FIG. 2. The positioning unit 315 or 335 may be a GPS (Global Positioning System) module, a RTLS (Real-Time Locating System) module, etc. to obtain a location of the electronic apparatus 110, 120, 130, 140 or 150. A sensor 317 may be an electronic compass, which is used to measure an angle of the mobile phone 110 relative to the Earth's magnetic field. Those skilled in the art may realize the sensor 317 as an accelerometer, a gyroscope or a G-sensor, and the invention should not be limited thereto.

Figure 4:
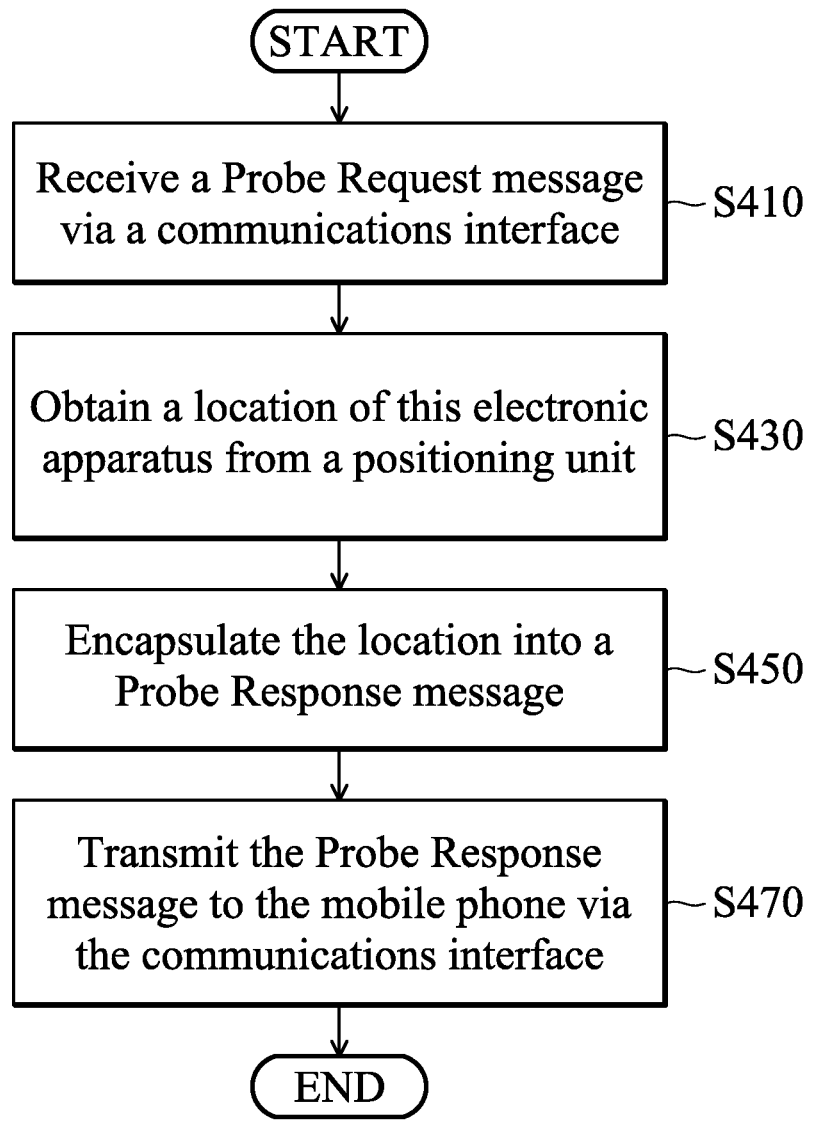
FIG. 4 is a flowchart illustrating a method for transmitting Probe Response messages, performed by a processing unit of an electronic apparatus, according to an embodiment of the invention.
Figure 5:
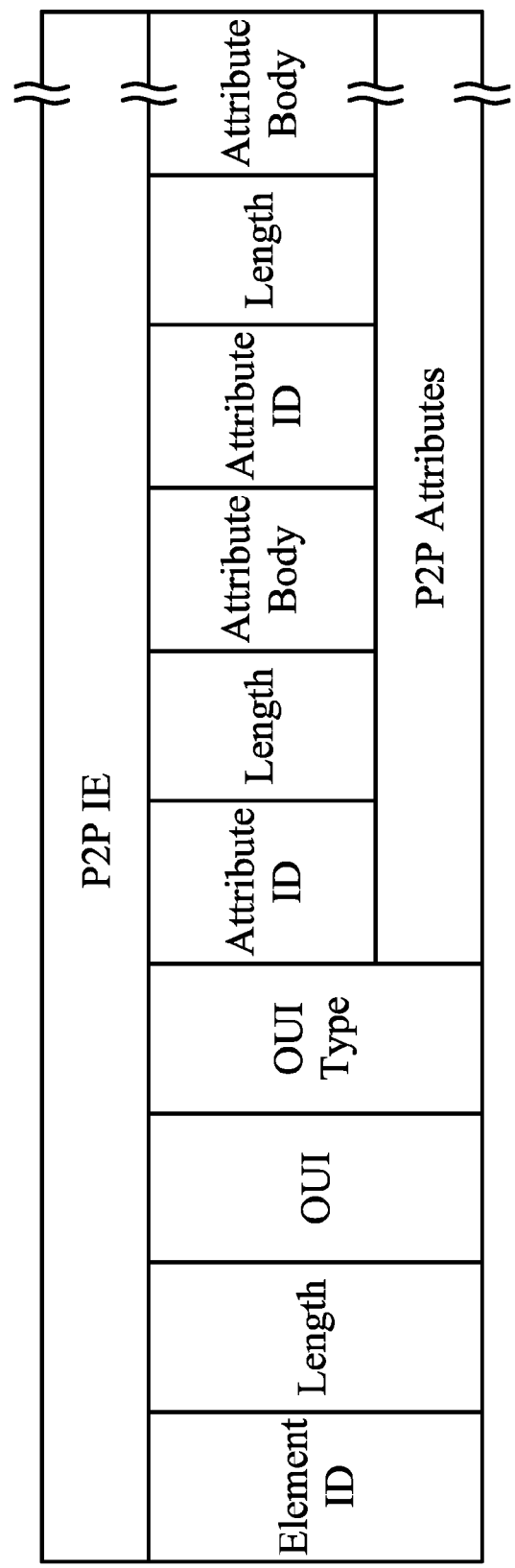
FIG. 5 is a diagram illustrating the data format of a P2P IE (Information Element)

FIG. 4 is a flowchart illustrating a method for transmitting Probe Response messages, performed by the processing unit 333 of any of electronic apparatuses 120 to 150, according to an embodiment of the invention. After receiving a Probe Request message 351 via the communications interface 331 (step S410), the processing unit 333 obtains a location of this electronic apparatus from the positioning unit 335 (step S430). The location of this electronic apparatus may be represented by a combination of latitude and longitude, the x-coordinate and the y-coordinate, etc. Subsequently, the processing unit 333 encapsulates the location into a Probe Response message 353 (step S450) and transmits the Probe Response message 353 to the mobile phone 110 via the communications interface 331 (step S470). The Probe Response message 353 includes at least a P2P IE (Information Element). FIG. 5 is a diagram illustrating the data format of a P2P IE. The P2P IE includes at least a P2P attributes field. The processing unit 333 may encapsulate the location of this electronic apparatus into an attribute body of the P2P attributes field, and set the attribute ID to a value ranging from 221 to 255. The attribute ID of a value ranging from 221 to 255 avoids interfering with the Wi-Fi P2P protocol between electronic apparatuses or the normal operations of other applications. The attribute ID of 221 indicates a vendor specific attribute while the attribute ID of a value ranging from 222 to 255 indicates a reserved attribute.

Figure 6:
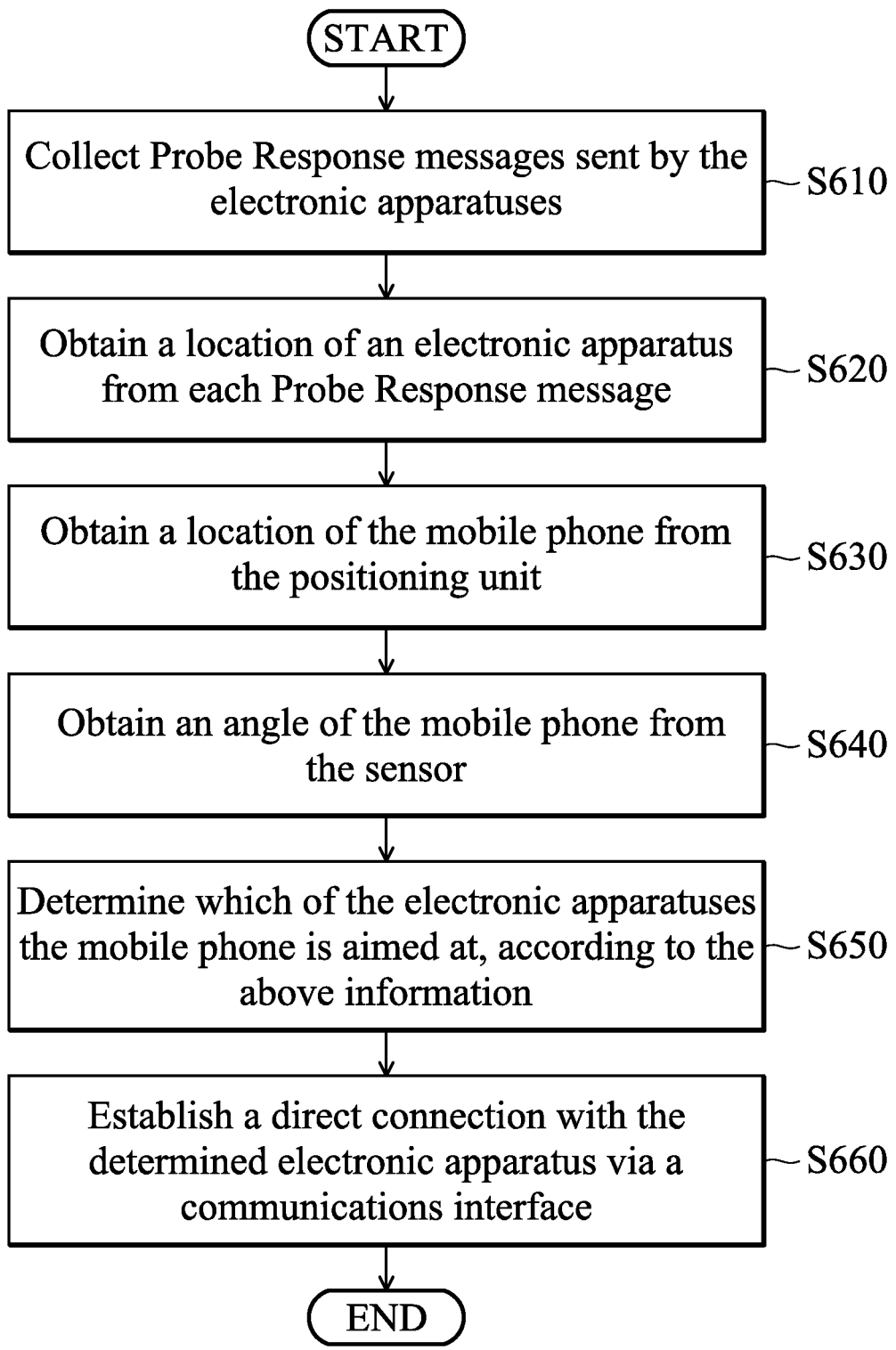
FIG. 6 is a flowchart illustrating a method for establishing a direct connection, performed by a processing unit of a mobile phone, according to an embodiment of the invention.
Figure 7:
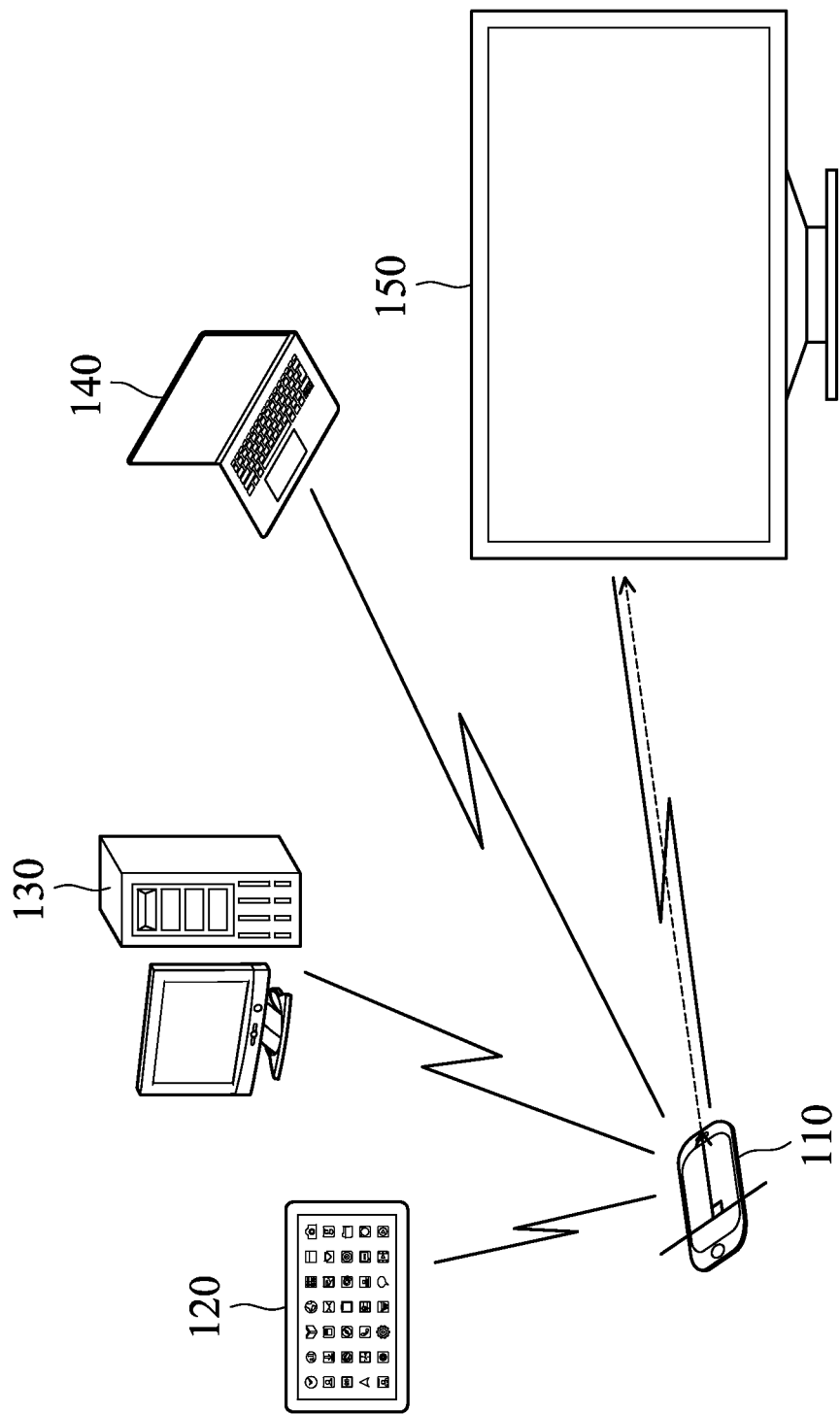
FIG. 7 is a schematic diagram for establishing a direct connection according to an embodiment of the invention.

FIG. 6 is a flowchart illustrating a method for establishing a direct connection, performed by the processing unit 313 of the mobile phone 110, according to an embodiment of the invention. After collecting Probe Response messages 353 sent by the electronic apparatuses 120 to 150 via the communications interface 311 (step S610), the processing unit 313 obtains a location of an electronic apparatus from each Probe Response message 353 (step S620). The location of an electronic apparatus may be represented by a combination of latitude and longitude, the x-coordinate and the y-coordinate, etc. In step S620, the processing unit 313 may parse the P2P IE of the Probe Response message to obtain the attribute body with the attribute ID of a value ranging from 221 to 255. The processing unit 313 obtains a location of the mobile phone 110 from the positioning unit 315 (step S630), and an angle of the mobile phone 110 from the sensor 317 (step S640). Next, the processing unit 313 determines which of the electronic apparatuses 120 to 150 the mobile phone 110 is aimed at, according to the locations of the electronic apparatuses 120 to 150 and the mobile phone 110 and the angle of the mobile phone 110 relative to the Earth's magnetic field (step S650). Finally, the processing unit 313 establishes a direct connection with the determined electronic apparatus via the communications interface 311 (step S660). In step S660, the mobile phone 110 continues GO Negotiation and WPS Provisioning with the determined electronic apparatus to establish a direct connection. Technical details of establishing a direct connection of Wi-Fi Connect may refer to the specification Wi-Fi Peer-to-Peer (P2P) Technical Specification 1.1 published in 2010 by Wi-Fi alliance. FIG. 7 is a schematic diagram for establishing a direct connection according to an embodiment of the invention. A user may place the mobile phone 110 being aimed at the smart TV 150 and activate the aforementioned technology. After collecting locations of the tablet computer 120, the desktop computer 130, the notebook computer 140 and the smart TV 150, the mobile phone 110 determines the smart TV 150 that the mobile phone 110 is aimed at with reference made to the location of the mobile phone 110 and the angle of the mobile phone 110 relative to the Earth's magnetic field. Next, the mobile phone 110 establishes a direct connection with the smart TV 150.

Although the embodiment has been described as having specific elements in FIGS. 2 and 3, it should be noted that additional elements may be included to achieve better performance without departing from the spirit of the invention. While the process flows described in FIGS. 4 and 6 each include a number of operations that appear to occur in a specific order, it should be apparent that these processes can include more or fewer operations, which can be executed in series or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for establishing a direct connection, comprising:
    obtaining, by a first processing unit of a first electronic apparatus, a first location of the first electronic apparatus;
    obtaining, by the first processing unit, an angle of the first electronic apparatus;
    collecting, by the first processing unit, a plurality of second locations via a first communications interface of the first electronic apparatus, wherein each second location is a location of a second electronic apparatus;
    determining, by the first processing unit, which of the second electronic apparatuses the first electronic apparatus is aimed at, according to the first location, the second locations, and the angle of the first electronic apparatus; and
    establishing, by the first processing unit, a direct connection with the determined second electronic apparatus via the first communications interface.

2. The method of claim 1, further comprising:
    transmitting, by the first processing unit, a Probe Request message to each second electronic apparatus via the first communications interface.

3. The method of claim 2, wherein each second location is encapsulated in a Probe Response message.

4. The method of claim 3, wherein the Probe Response message comprises a P2P (peer-to-peer) attributes field, the P2P attributes field comprises an attribute ID and an attribute body, and the attribute body comprises the second location.

5. The method of claim 4, wherein the attribute ID is 221.

6. The method of claim 4, wherein the attribute ID is a value ranging from 222 to 255.

7. The method of claim 3, further comprising:
    receiving, by a second processing unit of one second electronic apparatus, the Probe Request message via a second communications interface of the second electronic apparatus;
    obtaining, by the second processing unit, the second location;
    encapsulating, by the second processing unit, the second location into the Probe Response message; and
    transmitting, by the second processing unit, the Probe Response message to the first electronic apparatus via the second communications interface.

8. The method of claim 7, wherein the Probe Response message comprises a P2P (peer-to-peer) attributes field, the P2P attributes field comprises an attribute ID and an attribute body, and the attribute body comprises the second location.

9. The method of claim 8, wherein the attribute ID is 221.

10. The method of claim 8, wherein the attribute ID is a value ranging from 222 to 255.

11. A system for establishing a direct connection, comprising:
    a first electronic apparatus, comprising:
        a first communications interface;
        a first positioning unit;
        a sensor; and
        a first processing unit, coupled to the first communications interface, the first positioning unit and the sensor, obtaining a first location of the first electronic apparatus from the first positioning unit; obtaining an angle of the first electronic apparatus from the sensor; collecting a plurality of second locations via the first communications interface, wherein each second location is a location of a second electronic apparatus; determining which of the second electronic apparatuses the first electronic apparatus is aimed at, according to the first location, the second locations, and the angle of the first electronic apparatus; and establishing a direct connection with the determined second electronic apparatus via the first communications interface.

12. The system of claim 11, wherein the first processing unit transmits a Probe Request message to each second electronic apparatus via the first communications interface.

13. The system of claim 12, wherein each second location is encapsulated in a Probe Response message.

14. The system of claim 13, wherein the Probe Response message comprises a P2P (peer-to-peer) attributes field, the P2P attributes field comprises an attribute ID and an attribute body, and the attribute body comprises the second location.

15. The system of claim 14, wherein the attribute ID is 221.

16. The system of claim 14, wherein the attribute ID is a value ranging from 222 to 255.

17. The system of claim 13, further comprising:
    a second electronic apparatus, comprising:
        a second communications interface;
        a second positioning unit; and
        a second processing unit, coupled to the second communications interface and the second positioning unit, receiving the Probe Request message via the second communications interface; obtaining the second location from the second positioning unit; encapsulating the second location into the Probe Response message; and transmitting the Probe Response message to the first electronic apparatus via the second communications interface.

18. The system of claim 17, wherein the Probe Response message comprises a P2P (peer-to-peer) attributes field, the P2P attributes field comprises an attribute ID and an attribute body, and the attribute body comprises the second location.

19. The system of claim 18, wherein the attribute ID is 221.

20. The system of claim 18, wherein the attribute ID is a value ranging from 222 to 255.

21. The system of claim 18, wherein the first positioning unit and the second positioning unit are GPS (Global Positioning System) modules or RTLS (Real-Time Locating System) modules.

22. The system of claim 11, wherein the sensor is an electronic compass.

* * * * *